United States Patent [19]
Hobbs et al.

[11] Patent Number: 5,883,620
[45] Date of Patent: Mar. 16, 1999

[54] ELECTRONIC PRIZE VERIFICATION AND DISPLAY APPARATUS

[75] Inventors: Dennis Edwin Hobbs, Mississauga; Stephen James Phillips, Pickering, both of Canada; Malcolm Duncan McAlpine, Danbury, Conn.

[73] Assignee: Fort James Corporation, Deerfield, Ill.

[21] Appl. No.: 740,230

[22] Filed: Oct. 25, 1996

[51] Int. Cl.⁶ ..................................................... G09G 5/00
[52] U.S. Cl. ................................ 345/168; 705/14; 463/30
[58] Field of Search .............................. 345/168; 705/14; 463/16, 17, 1, 30, 31, 35; 235/383

[56] References Cited

U.S. PATENT DOCUMENTS

| | | |
|---|---|---|
| 4,171,085 | 10/1979 | Doty . |
| 4,191,376 | 3/1980 | Goldman et al. . |
| 4,203,240 | 5/1980 | Goodwin . |
| 4,287,824 | 9/1981 | Boyle . |
| 4,340,887 | 7/1982 | Dias, II .................................... 345/168 |
| 4,373,726 | 2/1983 | Churchill et al. . |
| 4,398,708 | 8/1983 | Goldman et al. . |
| 4,518,639 | 5/1985 | Phillips ..................................... 428/35 |
| 4,559,729 | 12/1985 | White . |
| 4,573,954 | 3/1986 | Berger et al. .............................. 493/55 |
| 4,669,729 | 6/1987 | Solitt et al. . |
| 4,706,873 | 11/1987 | Schulz . |
| 4,832,341 | 5/1989 | Muller et al. . |
| 4,884,504 | 12/1989 | Sillars . |
| 4,885,574 | 12/1989 | Negishi et al. .......................... 345/168 |
| 4,982,346 | 1/1991 | Girouard .................................... 705/14 |
| 5,007,578 | 4/1991 | Simone . |
| 5,007,641 | 4/1991 | Seidman . |
| 5,076,433 | 12/1991 | Howes . |
| 5,115,231 | 5/1992 | Avila et al. ............................... 345/168 |
| 5,128,752 | 7/1992 | Von Kohorn .............................. 358/84 |
| 5,191,979 | 3/1993 | Nemeroff . |
| 5,231,488 | 7/1993 | Mohrbacher et al. ................... 345/168 |
| 5,301,802 | 4/1994 | Nemeroff . |
| 5,305,181 | 4/1994 | Schultz .................................... 345/168 |
| 5,481,094 | 1/1996 | Suda ........................................ 235/383 |
| 5,508,731 | 4/1996 | Kohorn ...................................... 348/1 |
| 5,579,034 | 11/1996 | Aoyama et al. ......................... 345/168 |
| 5,604,516 | 2/1997 | Herrod et al. ........................... 345/168 |

*Primary Examiner*—Regina Liang
*Attorney, Agent, or Firm*—Sixbey, Friedman, Leedom & Ferguson, PC; Charles M. Leedom, Jr.; Donald R. Studebaker

[57] ABSTRACT

An electronic prize verification and display apparatus that provides an interactive interface with a consumer to receive information, such as an alphanumeric data sequence that includes a plurality of digits, indicative of a prize to be awarded to that consumer. The display apparatus compares the received alphanumeric data sequence with a predetermined series of winning sequences and displays a prize won by the consumer or a message encouraging the consumer to try again. The alphanumeric data sequence could be a prize code printed on a consumer product, such as a paper cup. Upon purchase of the product, a consumer would enter the prize code into the electronic prize verification and display apparatus to determine if the prize code was a winning code, and if so, the prize won. To facilitate entry of the prize code and display of an appropriate message to the consumer, the electronic prize verification and display apparatus preferably includes a keypad and liquid crystal display. As each digit of the alphanumeric data sequence is entered into the apparatus, it is displayed on the liquid crystal display. Upon entry of a predetermined number of digits, or upon actuation of an appropriate key by the consumer, the entered sequence is compared to the predetermined series of winning sequences for verification.

24 Claims, 6 Drawing Sheets

FIG.3A
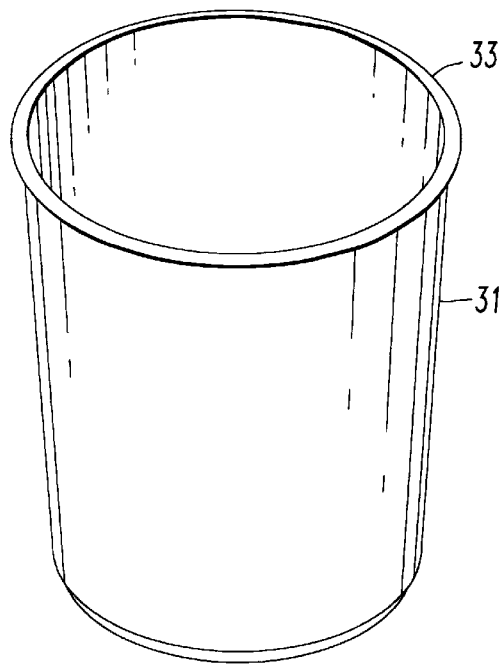
FIG.3B
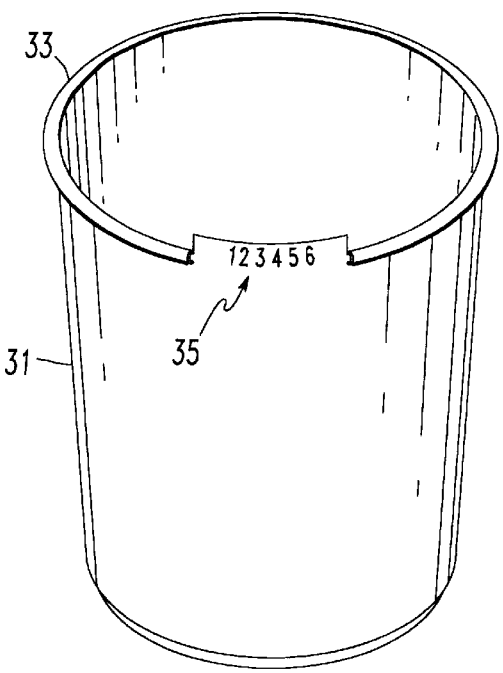
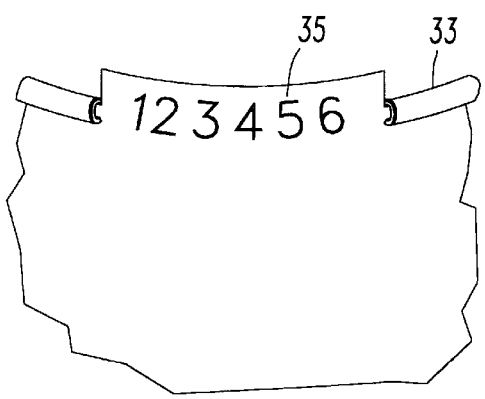
FIG.3C 6 5 4 3 2 1

*FIG. 4A*

CONGRATULATIONS !

*FIG. 4B*

YOU HAVE WON A

*FIG. 4C*

FREE COFFEE !

SORRY !

*FIG.5B*

BETTER LUCK

*FIG.5C*

NEXT TIME !

*FIG.5D*

ELECTRONIC PRIZE VERIFICATION AND DISPLAY APPARATUS

BACKGROUND OF THE PRESENT INVENTION

1. Field of the Invention

The present invention is generally directed to an improved interactive electronic prize verification and display system and method for use in conducting consumer promotions and more particularly relates to such a system and method wherein a prize code printed on a concealed portion of a consumer article, such as a paper cup, is entered into the interactive electronic prize verification and display system by a consumer to determine if the article entitles the consumer to a prize.

2. Discussion of Related Art

A variety of consumer promotion programs wherein a prize indicating indicia is placed on a consumer product have been used in the past. Of primary importance in conducting such programs is the enjoyment experienced by a consumer of the product, thus encouraging the consumer to purchase additional products. Typically, such consumer promotions include an indicia, or code, imprinted on a consumer product that indicates a prize won by the consumer. In such cases, in addition to being inexpensive and easy to manufacture, it is also important that the indicia be either obscured or not readily decipherable as a winning code, as well as tamper resistant.

Otherwise, fraud can occur wherein the winning products are removed prior to distribution to a consumer. Furthermore, an electronic or other apparatus has been used in combination with the indicia to increase the degree of interactivity with the consumer, thus heightening the excitement and enjoyment of the consumer. Where such an apparatus is used, the ability to easily manufacture and maintain such apparatus is critical.

Prior consumer promotions typically involved the separate manufacture of a peelable label to be affixed at a later time to the consumer product or the forming of a layer of material on the product which is subsequently scratched off by the consumer. In the former, the peelable label is removed by the consumer to reveal whether a prize has been won, while in the latter, the consumer scratches the layer of material from the product to uncover a prize. Such labels and scratch layers provide security by obscuring the winning indicia and are generally tamper resistant in that they reveal attempts to surreptitiously obtain the indicia. Such labels and scratch layers, however, are expensive to manufacture and present further difficulties in the manufacture of the associated consumer product to which the label or scratch layer is to be attached. Furthermore, such labels do not provide significant consumer interaction, and thus are less desirable then other promotions having greater interaction with the consumer.

To overcome the expense and difficulties associated with the manufacture of peelable layers and scratch coatings, consumer products have been designed wherein the prize indicating indicia is concealed in a tamper resistant manner within a natural form of the consumer product. For example, U.S. Pat. 4,518,639 to Phillips discloses a game cup having game information printed inside the rolled lip of the cup. The cup includes a snap-out section that is used to unroll the lip of the cup to reveal the printed game information. While concealing the game information inside the rolled lip, the device and method of Phillips simply provides the prize on the consumer product without coding the prize information to prevent easy selection and removal of the winning cups prior to consumer distribution. In order for a consumer promotion utilizing games or prizes to be effective, precautionary measures should be taken to ensure that a product having a winning code is not readily identifiable. In addition, as with peelable labels and scratch coatings, this method does not provide significant consumer interaction, and thus is less desirable then other promotions having greater interaction with the consumer.

U.S. Pat. 4,573,954 to Berger et al. discloses an on-the-cup (OTC) promotion in which a machine printed and machine readable code is placed on each cup. The machine readable code contains promotional prize information and is scanned and interpreted by a cup scanner to determine if the cup is a prize winner. Thus, while Berger et al. provides security (in the form of a machine readable code that is not readily decipherable to the naked eye) and increased consumer interaction, a complex scanning mechanism is required to be placed at a plurality of point-of-sale locations in order to interpret the machine readable codes. The scanning mechanism includes a scanning head having a code illuminating light and a photodetector that is driven by a motor and worm screw mechanism to scan the machine readable code. Thus, the costs associated with manufacturing and maintaining such a complex apparatus in connection with the consumer promotion is undesirable.

In view of the above, it is evident that a system and method is needed for conducting consumer promotions that provides for inexpensive and easy fabrication of the consumer product that still prevents fraud in the promotion, and that provides for increased user interaction, and thus enjoyment, on the part of a consumer of that product without a complex apparatus that is both expensive to manufacture and maintain. More specifically, a need exists for an electronic prize verification and display apparatus and method in which a code concealed on a consumer product in a tamper resistant manner can be verified as a winning or losing code through the use of an inexpensive and easily maintained apparatus that provides for heightened user interaction and enjoyment.

SUMMARY OF THE INVENTION

In view of the foregoing, it is an object of the present invention to provide an improved electronic prize verification and display apparatus and method for use in conducting a consumer promotion having enhanced consumer interaction, thus increasing consumer attraction and enjoyment.

It is a still further object of the present invention to provide an improved electronic prize verification and display apparatus and method for use in conducting consumer promotions that includes data entry means, such as a keypad, for interactively receiving an alphanumeric data sequence including a plurality of digits corresponding to a prize to be awarded to a consumer.

It is a further object of the present invention to provide an improved electronic prize verification and display apparatus and method for use in conducting consumer promotions in which a user must actuate a key indicating completion of entry of the data sequence in order to initiate operation of the apparatus and thereby determine if a prize has been won.

It is yet another object of the present invention to provide an improved electronic prize verification and display apparatus and method for use in conducting a consumer promotion that reduces the likelihood of fraud associated with the consumer promotion.

It is a still further object of the present invention to provide an improved electronic prize verification and display apparatus and method for use in conducting a consumer promotion in which a pseudo-random prize code is imprinted on each of a plurality of consumer products such that winning prize codes cannot be readily identified without the use of the electronic prize verification and display apparatus.

It is yet a further object of the present invention to provide an improved electronic prize verification and display apparatus and method for use in conducting a consumer promotion in which a prize code is imprinted on a consumer product such that attempts to surreptitiously tamper with the product to obtain the prize code are readily evident upon inspection of the product.

It is another object of the present invention to provide an improved electronic prize verification and display apparatus and method for use in conducting a consumer promotion in which a prize code is imprinted on a consumer product such that the prize code is not visible without deforming the consumer product.

It is yet another object of the present invention to provide an improved electronic prize verification and display apparatus and method that is simple to manufacture and easy to install and maintain at a variety of locations for promoting one or more products to a consumer.

A further object of the present invention is to provide an improved electronic prize verification and display apparatus and method embodied in a solid state operating circuit that requires little or no maintenance after installation.

A still further object of the present invention is to provide an improved electronic prize verification and display apparatus and method that includes data input and output means operatively connected with a central processing unit containing verification software operating to verify a prize code received from a consumer through the data input means.

These and other objectives are achieved in accordance with the present invention through the provision of an electronic prize verification and display apparatus that provides an interactive interface to a consumer to receive information, such as an alphanumeric data sequence that includes a plurality of digits, indicative of a prize to be awarded to that consumer. The display apparatus compares the received alphanumeric data sequence with a predetermined series of winning sequences and displays a prize won by the consumer or a message encouraging the consumer to try again.

In accordance with the present invention, the alphanumeric data sequence could be a prize code printed on a consumer product, such as a paper cup. Upon purchase of the product, a consumer would enter the prize code into the electronic prize verification and display apparatus to determine if the prize code was a winning code, and if so, the prize won. To facilitate entry of the prize code and display of an appropriate message to the consumer, the electronic prize verification and display apparatus preferably includes a keypad and liquid crystal display. As each digit of the alphanumeric data sequence is entered into the apparatus, it is displayed on the liquid crystal display. Upon entry of a predetermined number of digits, or upon actuation of an appropriate key by the consumer, the entered sequence is compared to the predetermined series of winning sequences.

In the most preferred embodiment of the present invention, the alphanumeric data sequence is a series of digits concealed under a brim curl of a cup purchased by the consumer. This feature enhances security of the consumer promotion in at least two ways. First, tamper resistance is achieved by printing the prize code under the brim curl of the cup since it is extremely difficult to reveal the number without unrolling and destroying the brim of the cup, thus exposing the tampering.

Second, each of the prize codes can be a unique, pseudo-random alphanumeric data sequence of sufficient length such that even should it be discovered, the determination of winning or losing numbers is extremely difficult if not impossible without access to the electronic prize verification and display apparatus. Specifically, all data sequences received from a consumer that do not match one of the predetermined winning sequences are treated as "losing" sequences. Thus, since a relatively limited number of sequences result in a prize, there remains a large number of "losing" sequences that can be randomly employed to prevent easy identification of the winning or losing combinations by a consumer.

BRIEF DESCRIPTION OF THE DRAWINGS

FIG. 3a is an elevational view of a cup having a predetermined prize code concealed under its curled brim in accordance with a preferred embodiment of the present invention;

FIG. 3b is an elevational view of a cup having a predetermined prize code revealed after tearing and straightening a portion of the curled brim in accordance with a preferred embodiment of the present invention;

FIG. 3c is an enlarged view of a portion of a brim curl of a cup shown in FIG. 3b illustrating in more detail a predetermined prize code after tearing and straightening a portion of the curled brim.

FIG. 4a–d are views of the display of the present invention during and after entry of a predetermined winning code in accordance with a preferred embodiment of the present invention;

FIG. 5a–d are views of the display of the present invention during and after entry of a predetermined losing code in accordance with a preferred embodiment of the present invention.

DETAILED DESCRIPTION OF THE PRESENT INVENTION

The present invention is directed to an electronic prize verification and display apparatus that provides an interactive interface with a consumer to receive information, such as an alphanumeric data sequence that includes a plurality of digits, indicative of a possible prize to be awarded to that consumer. The display apparatus compares the received alphanumeric data sequence with a predetermined series of winning sequences and displays a prize won by the consumer or a message encouraging the consumer to try again.

The present invention improves upon the currently existing consumer promotion devices in at least three ways. First, the electronic prize verification and display apparatus increases the amount of consumer interaction and enjoyment by allowing the consumer to verify for themselves in an interactive manner whether they have won a prize. Due to its consumer appeal, this apparatus and method helps to promote and increase the sale of a product while being simple to manufacture and operate. Second, the present invention provides increased security by concealing the alphanumeric data sequence on a consumer product in a manner that readily reveals efforts to surreptitiously obtain the data sequence without detrimentally increasing the cost of manufacturing the customer product. Furthermore, a large number of pseudo-random alphanumeric data sequences are employed, thus making it difficult or impossible to recognize winning codes without the use of the electronic prize verification and display apparatus. Third, the present invention provides an electronic prize verification and display apparatus that provides increased interactivity and security while remaining inexpensive to manufacture and maintain relative to prior art devices.

Figure 1:
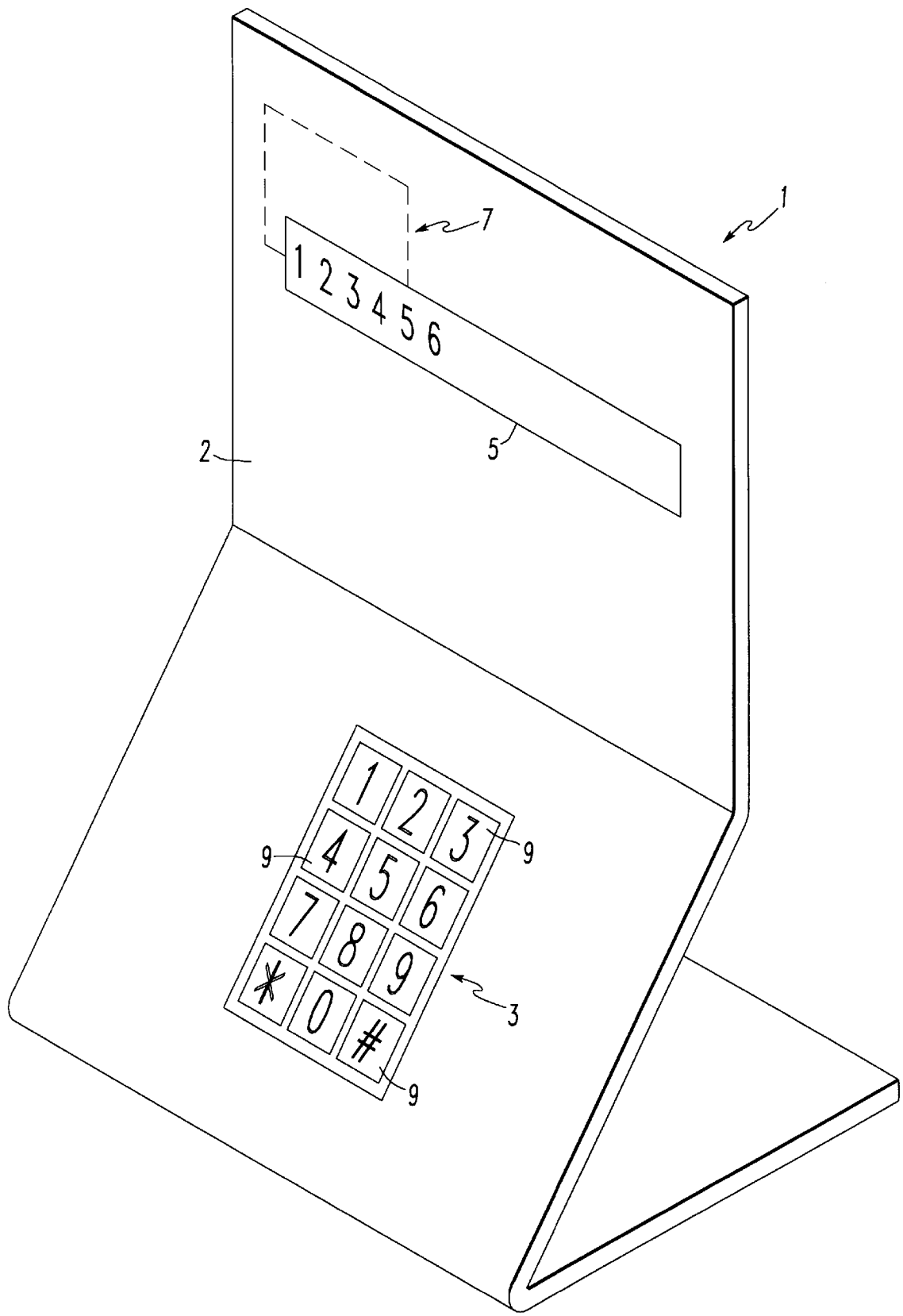
FIG. 1 is perspective view of the electronic prize verification and display apparatus in accordance with a preferred embodiment of the present invention.

Referring now to the drawings, FIG. 1 illustrates a preferred embodiment of the electronic prize verification and display apparatus 1 of the present invention. The apparatus 1 includes an input device, such as keypad 3 for entering data into apparatus 1, a display 5 for displaying the data entered into, and messages generated by, apparatus 1, and an electronic circuit 7 for controlling keypad 3 and display 5. Apparatus 1 includes a base 2 which may be manufactured and formed from any rigid material that will support keypad 3, display 5 and electronic circuit 7. The base 2 may comprise plastic, metal, wood or any other suitable material. In a preferred embodiment, base 2 is formed from plexiglass and is manufactured by ACRA-FAB, 21 Progress Ave., Unit 6, Scarb., Ontario, CANADA. Keypad 3, display 5, and electronic circuit 7 are mounted on base 2 as shown in FIG. 1. However, one skilled in the art should recognize that keypad 3, display 5 and electronic circuit 7 may be separated and configured in any manner without changing the spirit or scope of the present invention.

In a preferred embodiment, keypad 3 comprises a series of alphanumeric keys 9 having numbers ranging from 0 to 9 and the symbols "*" and "#". A user would enter a code and sequence of numbers by depressing the key or keys corresponding to a particular number or sequence of numbers printed on a consumer product, such as a cup. In this preferred embodiment, the user would use the "*" key to clear the characters on display 5 and the "#" as an "enter" or "return" key once a complete code is entered. The keypad, however, may have alternative functions and characters for performing a variety of tasks, such as, entering symbols, letters or other similar characters. In addition, function keys may be provided for deleting only one character instead of a string of characters, or to provide "help" to the user for operating the apparatus. Furthermore, Keypad 3 used in this preferred embodiment is merely one example of an input device that may be used with the present invention.

Display 5 shown in FIG. 1 is preferably a single-line, 20-character liquid crystal diode (LCD) display, such as for displaying any combination of alphanumeric characters in the form of messages which are viewed by the user. Any type of display, however, may be used with the present invention including light emitting diode (LED) displays and other similar types. Alternatively, the display characteristics may be more complex than that used in the preferred embodiment of the present invention. For example, an LCD or LED display able to accommodate multiple lines of characters or able to display color pictures of prizes available may be used with the present invention. Therefore, one skilled in the art should recognize that the present invention is not to be limited to the elements discussed in detail herein.

Both the keypad and display allow a consumer to interact with apparatus 1 to determine if the consumer has won a prize based on a code printed on a consumer product. By allowing the consumer to interact with apparatus to verify their prize winning status, the consumer can feel the anticipation of winning, as if playing a game or lottery. Moreover, the consumer is encouraged to keep entering codes from the consumer product to win, thus increasing the number of sales of the product. Previously used prize verifications systems do not allow for such interaction and thus, do not offer similar enjoyment or encouragement for the consumer to keep buying the product to increase their chances to win a prize.

In addition to keypad 3 and display 5, a controller in the form of electronic circuit 7 is used to control the functionality of apparatus 1. As shown in FIG. 1, electronic circuit 7 is either concealed behind or within base 2. Electronic circuit 7 is operably coupled with keypad 3 and display 5 for controlling input and output operations and is discussed below in greater detail with regard to FIG. 2.

As discussed below, circuitry 7 generally operates to receive and process alphanumeric data sequences received from consumers and to indicate if such sequences entitled the consumer to a prize. Much of this functionality is embodied in software, the source code of which is provided as Listing 1, immediately following this detailed description. While this source code represents a preferred embodiment of the software of the present invention, those skilled in the art will recognize that changes to this software could be made within the scope of the present invention. Thus, the software could be translated into a different programming language, the messages and audible features enhanced or modified, or the overall order of execution could be changed without modifying the fundamental operating characteristics thereof and thus remaining within the scope of the present invention.

Figure 2:
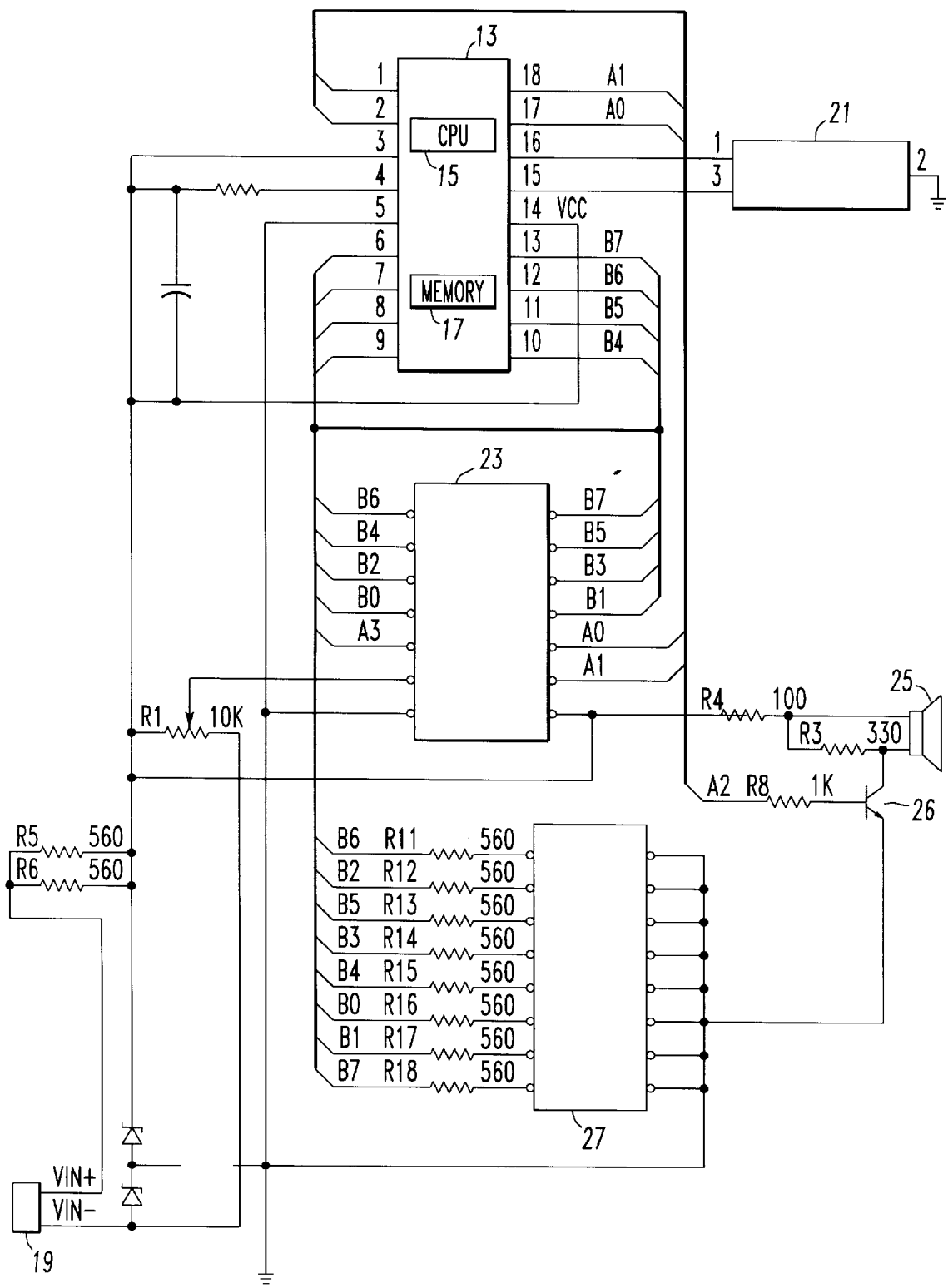
FIG. 2 is a schematic diagram of the electronic circuit used in the electronic prize verification and display apparatus in accordance with a preferred embodiment of the present invention.

FIG. 2 illustrates a schematic diagram of electronic circuit 7 used in the electronic prize verification and display apparatus 1 in accordance with a preferred embodiment of the present invention. Electronic circuit 7 includes a programmable integrated circuit, or PIC, 13 that operates as the controller for apparatus 1. PIC 13 generally includes a central processing unit (CPU) 15 for processing data and a memory 17 for storing a plurality of predetermined winning alphanumeric data sequences, program code and data used for the operation of PIC 13, and data entered by a user using keypad 3 during operation of the apparatus 1.

Additional elements of electronic circuit 7 are connected to PIC 13 as shown in FIG. 2. Power jack 19 interfaces with a power source to provide suitable power to electronic circuit 7 and other components, such as display 5, of the apparatus 1. In the most preferred embodiment, power jack 19 connects through a transformer (not shown) to a standard commercial AC power outlet. Resonator 21, which may be a Panasonic 8.0 Mhz PX800 resonator, is connected with PIC 13 and functions as an oscillator for the operation of PIC 13. Output header 23 and an input header 27, which could be headers manufactured by Molex, have "7×2" and "8×2" pin configurations, respectively. Output header 23 is connected to display 5 and serves to provide an electrical interface between circuit 7 and display 5 to allow data to be displayed on display 5. Input header 27 is connected to keypad 3 and serves to provide an electrical interface between circuit 7 and keypad 3 to allow entered data to be received and processed by circuit 7. Speaker 25, which may be a 50 Ohm speaker, Model No. 12RT04CC manufactured by Matimushita, is connected through transistor 26 to PIC 13. In operation, PIC 13 sends suitable control signals to transistor 26 to cause speaker 25 to emanate an audible tone. Speaker 25 permits audible verification of a winning or losing code entered into apparatus 1 and may be used to play music for the user's enjoyment while verifying prize information. A plurality of secondary circuit elements including wires, resistors, diodes and other devices are used as shown in FIG. 2 to connect the elements discussed above together. While the connection of these secondary circuit elements are not discussed in detail herein, they are clearly illustrated in FIG. 2, such that one skilled in the art may construct an enabling device therefrom.

From the above, it will be clear that a preferred embodiment of the electronic prize verification and display apparatus is substantially fabricated from solid state components having a high reliability and low failure rate. Through the provision of PIC 13, which integrates a number of the components essential to the operation of the apparatus 1 including a central processing unit and program memory, the reliability of electronic circuit 7 is greatly increased. As a result, the apparatus 1 is inexpensive to manufacture and requires little or no maintenance after installation at a location where consumer products are distributed, such as a restaurant or convenience store.

In accordance with the present invention, apparatus 1 is used in conjunction with a consumer product having a code printed thereon which is entered into apparatus 1 to determine if the code entitles the consumer to a prize. In a preferred embodiment, the consumer product is a cup and the code is an alphanumeric data sequence.

An exemplary cup 31 is shown in FIG. 3a comprising a brim curl 33 on its upper lip portion. Cup 31 is preferably formed from a paperboard or similar material and may be of varying sizes. During manufacturing of the cup, an alphanumeric data sequence 35 is printed on the upper portion of the paperboard blank before it is formed into a cup including brim curl 33. Cup 31 should be printed, such that, once brim curl 33 is formed, the alphanumeric data sequence 35 is concealed under the brim curl. It should be noted that the alphanumeric data sequence 35 may be printed on the cup after the cup shell is formed but prior to the forming of the brim curl 33. When the cup is purchased, the consumer uncovers alphanumeric data sequence 35, as shown in FIGS. 3b and 3c, by applying an upward force on the brim curl 33, thus uncurling the brim curl 33 and tearing a portion of the brim adjacent to the location where the alphanumeric data sequence 35 is printed. FIG. 3c illustrates an enlarged view of the upper portion of cup 31 showing the brim curl 33 in an extended position with the alphanumeric data sequence exposed. Once revealed, the consumer is now able to enter the alphanumeric data sequence into the electronic prize verification and display apparatus to see if they are entitled to a prize.

Alphanumeric data sequence 35 is a series of six numbers in a preferred embodiment, such as "123456." Nevertheless, the alphanumeric data sequence may take one of many different forms, such as letters, symbols, a combination of letters and numbers, etc. Of course, the keypad characters would need to be modified in order to match the characters of the alphanumeric data sequence for entry. In addition, the number of characters in the alphanumeric data sequence may be altered depending on the desired complexity of the game. For example, the alphanumeric data sequence may have one character "3" or ten characters "0123456789."

Having an alphanumeric data sequence or code printed under the brim curl enhances security of the consumer promotion in at least two ways. First, tamper resistance is achieved by printing the prize code under the brim curl of the cup since it is extremely difficult to reveal the number without unrolling and destroying the brim of the cup, thus exposing the tampering.

Second, each of the prize codes can be a unique, pseudorandom alphanumeric data sequences of sufficient length such that even should it be discovered via tampering, the determination of winning or losing numbers is extremely difficult if not impossible without individually entering each code into the electronic prize verification apparatus. Specifically, all data sequences entered by a consumer that do not match one of the predetermined winning sequences are treated as "losing" sequences by the electronic apparatus. Thus, since a relatively limited number of sequences result in a prize, there remains a large number of "losing" sequences that can be randomly employed to prevent easy identification of the winning or losing combinations. Therefore, winning cups cannot be easily removed prior to distribution to the consumers.

FIGS. 4a–d illustrate the displayed events which occur when a consumer enters the code from a consumer product, or cup as in the preferred embodiment, into apparatus 1 via keypad 3. Beginning with FIG. 4a, the code entered onto the keypad is displayed on the LCD screen of apparatus 1. The six digit number is clearly displayed so that the consumer can see each digit being entered on keypad 3. If a wrong key has been depressed, the consumer can clear the LCD screen by hitting the "*" key. This clears all entries into apparatus 1 and returns to a blank screen, thus permitting the user to correctly re-enter the entire alphanumeric data sequence.

Once the six-digit code is entered, as shown in the FIG. 4a, the consumer then hits the "#" to indicate that the complete code has been typed into apparatus 1. The "#" causes apparatus 1 to compare the code to the predetermined series of winning sequences. In the alternative, apparatus 1 will automatically compare the code entered by the consumer with the predetermined series of winning codes after a predetermined number of digits have been entered. If the entered code is a winning entry, a message, shown in FIGS. 4b–d, is displayed on the LCD screen. The number of winning codes is predetermined and may be any number desired by the controller of the electronic prize verification and display apparatus. In a preferred embodiment, the number of winning codes is 4, however, one skilled in the art should appreciate that the number of winning codes may change. In addition, the message shown in FIGS. 4b–d is a preferred message used in the present invention, however, any message may be displayed that indicates to the consumer that they have entered a winning code and are entitled to a prize.

Along with the displayed text, the present invention provides the consumer with an audible indication that the consumer has entered a winning or losing code. The audible indication is in the form of music which is played while a winning or losing message is displayed on the LCD screen. The audible indication comprises two simple tunes, one for winning and one for losing, in the preferred embodiment. The winning tune in the preferred embodiment is a "CHARGE" tune normally heard during sports events, while the losing tune is a "SORRY" which has a less spirited tone. PIC 13 of FIG. 2 may be programmed to play a variety of different tunes and is not limited to the tunes discussed above.

FIGS. 5a–d display the process of entering a non-winning code into apparatus 1. Specifically, FIG. 5a illustrates a code entry typed in by a consumer. Upon entry, the code is compared to the predetermined series of winning sequences. If the code does not match a predetermined winning code, the LCD screen displays the message shown in FIGS. 5b–d. Again, as stated above, the message shown in FIGS. 5b–d is a preferred message used in the present invention, however, any message may be displayed that indicates to the consumer that they have entered a losing code and are not entitled to a prize.

Figure 6:
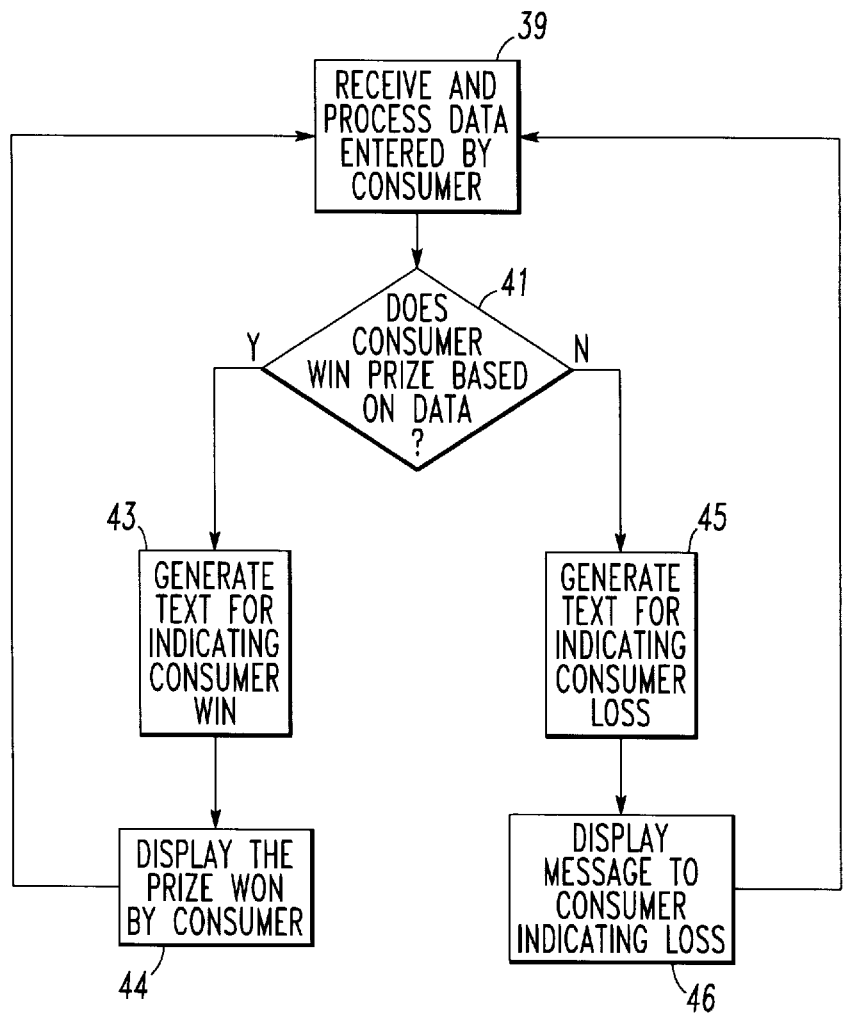
FIG. 6 is a flowchart illustrating the method of verifying a predetermined winning or losing code using the electronic prize verification and display apparatus of the present invention.

The method of verifying an alphanumeric data sequence of the present invention will now be discussed in more detail with reference to FIG. 6. The program code for performing the preferred method discussed below is attached following the detailed description of the present invention as Listing 1. Subsequent to the purchase of a product bearing a code as discussed above, a consumer enters the code into the electronic prize verification and display apparatus to determine if the prize code is a winning code, and if so, the prize won. The code is received and processed by PIC 13, shown in FIG. 2, where it is compared to predetermined winning codes stored in the memory of PIC 13, as illustrated in block 39. Upon comparing the entered code to the predetermined code, PIC 13 determines if a winning code has been entered, as shown in block 41. If the winning code has been entered, PIC 13 generates text for indicating that the consumer entered a winning code, as shown in block 43 and then displays the prize won by the consumer on the LCD screen as shown in block 44. If the consumer enters a losing code then PIC 13 generates text for indicating that the consumer entered a losing code, as shown in block 45 and then displays a message indicating that a losing code has been entered and encourages the consumer to try again, as illustrated in block 46. In either event, control returns from block 44 or 46 to block 39 to await the entry of another alphanumeric data sequence from a consumer and to subsequently process such data.

In the event that a winning code is entered, the consumer can receive the indicated prize by presenting the winning consumer product at an appropriate location, preferably co-located with the electronic verification system. The consumer product itself is required to be submitted to authenticate the prize award. In this manner, it is not necessary for the electronic verification apparatus to include a printer or other mechanical device to issue a "ticket" authorizing distribution of a prize. Such mechanical devices require frequent service and are prone to failure. Rather, in accordance with the present invention, a winning product is returned to a prize distribution location where the prize award is verified and the prize awarded to the consumer. To verify the prize award, the distribution location could include a similar electronic apparatus to that discussed above, where the number on the consumer product is input and verified as a winning product. Alternatively, a list of winning numbers and corresponding prizes could be provided at the distribution location, however this reduces security by identifying all winning numbers, and thus could result in increased fraud in conducting the consumer promotion.

The above-noted specification describes in detail an apparatus and method that allows the consumer to become involved in determining whether they have won a prize based on a code concealed on a consumer product. This type of promotion encourages consumers to keep purchasing one or more consumer products with hopes that they will eventually win a prize. Consequently, consumer interest in the product will increase resulting in increased sales and consumer demand. In addition, the invention discussed above provides an electronic prize verification and display apparatus wherein a prize code is concealed on a consumer product such that while it is readable by the consumer, it is also sufficiently generated to eliminate unidentifiable tampering and to effectively control and monitor the amount of prizes given away.

While the present invention has been described with reference to a preferred embodiment, it should be appreciated by those skilled in the art that the invention may be practiced otherwise than as specifically described herein without departing from the spirit and scope of the invention. It is, therefore, to be understood that the spirit and scope of the invention be limited only by the appended claims.

LISTING I

```
;******************************************************
;*      MR. MUGS COFFE AND DONUTS        * MUGS4.SRC
;*                       *
;*    SOURCE CODE (PARALLAX ASSEMBLER)     * Rev 4.00
;*                       *
;*      MARCH 6, 1996  G. Schneider    * 704 words
;******************************************************

; This version has two simple tunes - "SORRY" and "CHARGE".
; Because there are only 4 winning numbers, there is room for the music.

; Microchip 16C56-RC/P operating as HS at 8 MHz

DEVICE  PIC16C56,HS_OSC,WDT_OFF,PROTECT_OFF
        RESET   start
        ID      0F400h count0   =   08h         ;Temporary counter
        count1   =   09h         ;Temporary counter
        wcount   =   0Ah
        scount   =   0Bh
        dcount   =   0Ch
        keyreg   =   0Dh
        datareg  =   rb
        E        =   ra.0
        RS       =   ra.1
        output   =   ra.2
        end_note =   rc          ;Number of notes in the tune
        freq     =   0Eh         ;Passes frequency value to Beep
        duratn   =   0Fh         ;Passes duration value to Beep
        f_temp   =   10h         ;Temporary counter
        d_hi     =   11h         ;Temporary counter
        d_lo     =   12h         ;Temporary counter
        tgl      =   13h         ;Temporary counter
        t_pat    =   14h         ;Temporary variable
        index    =   15h         ;Note counter
        spkr     =   16h         ;temporary register
        digit    =   17h         ;displayed digit register
        reg1     =   18h
        reg2     =   19h
        reg3     =   1Ah
        reg4     =   1Bh
        reg5     =   1Ch
        reg6     =   1Dh

; *** SUBROUTINES - PAGE 1 ***

;getdata sub-routine getdata jmp     pc+w
        nop
        retw    'SORRY!'
```

```
        retw    'BETTER LUCK'
        retw    'NEXT TIME!'
        retw    'CONGRATULATIONS!'
        retw    'YOU HAVE WON!'
        retw    '"FIRST PRIZE"'
        retw    '"SECOND PRIZE"'
        retw    '"THIRD PRIZE"'

;loadlcd sub-routine loadlcd mov     datareg,w
        setb    E
        clrb    E
        call    wait30
        ret ; wait5 sub-routine - 5 mSec delay (10,000 instruction cycles)

wait5   clr     count0
        mov     count1,#13
:test   djnz    count0,:test    ; 3 cycles x 256
        djnz    count1,:test    ; x 13
        ret ; wait30 sub-routine - 30 msec delay (60,000 instruction cycles)

wait30  clr     count0
        mov     count1,#78
:test   djnz    count0,:test    ; 3 cycles x 256
        djnz    count1,:test    ; x 78
        ret ; wait100 sub-routine - 98 msec delay (197,000 instruction cycles)

wait100 clr     count0
        clr     count1
:test   djnz    count0,:test    ; 3 cycles x 256
        djnz    count1,:test    ; x 256
        ret ; wait1 sub-routine - 1 second delay (2,000,000 instruction cycles)

wait1   clr     f_temp
        clr     count0
        mov     count1,#10
:test   djnz    count0,:test    ;3 cycles x256
        djnz    f_temp,:test    ; x 256
        djnz    count1,:test    ; x 10
        ret ; clik subroutine clik    setb    ra.2
        call    wait5
```

```
        clrb    ra.2
        ret
;
; *** POWER UP STATE ***
;
; set up i/o registers and RTCC
;
start   mov     option,#11001000b       ;int RTCC, L to H, no prescaler
        clr     rb                      ;0.5uSec cycle time
        mov     !rb,#0
        clr     ra                      ;set RS to control mode
        mov     !ra,#0                  ;RS, E are outputs - set low
;
; Initialization routine
        call    wait30
        mov     w,#00110000b ;8 bit, 1 line, 5x7 font
        call    loadlcd
        mov     w,#00110000b ;8 bit, 1 line, 5x7 font
        call    loadlcd
        mov     w,#00110000b ;8 bit, 1 line, 5x7 font
        call    loadlcd
        mov     w,#00110000b ;8 bit, 1 line, 5x7 font
        call    loadlcd
        mov     w,#00001000b ;display off
        call    loadlcd
clr     clrb    RS              ;control mode
        mov     !rb,#0          ;all outputs
        mov     w,#00000001b ;clear display
        call    loadlcd
        mov     w,#00000110b ;set cursor inc, no display shift
        call    loadlcd
;
; End of initialization
;
        mov     w,#00001100b ;display on, cursor off, blink off
        call    loadlcd
        call    clik
        setb    RS              ;data mode
        clr     dcount
        mov     fsr,#18h
        mov     reg1,#255
        mov     reg2,#255
        mov     reg3,#255
        mov     reg4,#255
        mov     reg5,#255
        mov     reg6,#255
;
;
; *** KEYBOARD ENTRY STATE ***
;
kybd    mov     !rb,#00001111b  ;D0-D3 are inputs
        mov     rb,#0Fh         ;set all outputs low
:loop   cjne    rb,#0Fh,:loop   ;make sure no keys pressed
        call    wait30
```

```
row1    mov     rb,#60h         ;scan first row
        cje     rb,#6Fh,row2    ;not found, try row 2
        jnb     rb.0,clr        ;key entry was "*", clear display
        jnb     rb.1,seven      ;key entry was "7"
        jnb     rb.2,four       ; etc.
        jnb     rb.3,one
row2    mov     rb,#50h         ;scan second row
        cje     rb,#5Fh,row3    ;not found, try row 3
        jnb     rb.0,zero
        jnb     rb.1,eight
        jnb     rb.2,five
        jnb     rb.3,two
row3    mov     rb,#30h         ;scan third row
        cje     rb,#3Fh,kybd    ;not found, start again
        jnb     rb.0,end        ;key entry was "#",start check of data
        jnb     rb.1,nine
        jnb     rb.2,six
        jnb     rb.3,three

; *** DISPLAY WRITE STATE ***

; Numbers zero    mov     indirect,#0
        mov     digit,#'0'
        jmp     incdc one     mov     indirect,#1
        mov     digit,#'1'
        jmp     incdc two     mov     indirect,#2
        mov     digit,#'2'
        jmp     incdc three   mov     indirect,#3
        mov     digit,#'3'
        jmp     incdc four    mov     indirect,#4
        mov     digit,#'4'
        jmp     incdc five    mov     indirect,#5
        mov     digit,#'5'
        jmp     incdc six     mov     indirect,#6
        mov     digit,#'6'
        jmp     incdc seven   mov     indirect,#7
```

```
         mov    digit,#'7'
         jmp    incdc eight    mov    indirect,#8
         mov    digit,#'8'
         jmp    incdc nine     mov    indirect,#9
         mov    digit,#'9'
         jmp    incdc incdc    mov    !rb,#0
         mov    w,digit
         call   loadlcd
         call   clik
         inc    dcount
         cja    dcount,#6,clr
         inc    fsr
         jmp    kybd end      nop kr0      cjne   reg1,#4,kr4
         cjne   reg2,#5,kr4
         cjne   reg3,#6,kr4
         cjne   reg4,#3,kr4
         cjne   reg5,#7,kr4
         cjne   reg6,#4,kr4
         mov    keyreg,#0
         ljmp   preamb kr4      cjne   reg1,#4,kr5
         cjne   reg2,#5,kr5
         cjne   reg3,#8,kr5
         cjne   reg4,#2,kr5
         cjne   reg5,#0,kr5
         cjne   reg6,#1,kr5
         mov    keyreg,#4
         ljmp   preamb kr5      cjne   reg1,#5,kr6
         cjne   reg2,#4,kr6
         cjne   reg3,#3,kr6
         cjne   reg4,#6,kr6
         cjne   reg5,#4,kr6
         cjne   reg6,#7,kr6
         mov    keyreg,#5
         ljmp   preamb kr6      ljmp   kr6p2

; **** PAGE 2 ****
```

; SUB-ROUTINES

```
        org     512

Notes   jmp     pc+w            ;Lookup table for note frequencies.
        retw    90, 67, 52, 44, 52, 44, 44, 67

Lengths jmp     pc+w            ;Lookup table for note durations.
        retw    35, 35, 35, 55, 30, 127, 127, 127

Beep    mov     t_pat, #1       ;XOR enabled
        mov     f_temp, freq
        jnz     :cont
        mov     t_pat, #0       ;XOR disabled (silence) if freq = 0
:cont   mov     d_hi, duratn
        clr     d_lo
        mov     tgl, t_pat ; The following loop must be adjusted to execute in exactly 20 uSec.
; This represents 40 processor clock cycles.

:main   xor     spkr, tgl
:delay  movb    output,spkr.0
        nop
        nop
        nop
        nop
        nop
        nop
        nop
        nop
        nop
        nop
        nop
        nop
        nop
        nop
        nop
        nop
        djnz    f_temp, :t1
        mov     f_temp, freq
        mov     tgl, t_pat
:dur_lo sub     d_lo, #1
        jc      :t2
        sub     d_hi, #1
        sc
        ret
        jmp     :main
:t1     clr     tgl
        jmp     :dur_lo
```

```
:t2      nop
         nop
         nop
         jmp    :main

; END OF SUB-ROUTINES kr6p2    cjne   reg1,#1,nowin
         cjne   reg2,#0,nowin
         cjne   reg3,#2,nowin
         cjne   reg4,#8,nowin
         cjne   reg5,#5,nowin
         cjne   reg6,#4,nowin
         mov    keyreg,#6
         jmp    preamb nowin    mov    !rb,#0
         mov    end_note,#8
         mov    index,#6
         jmp    music sorry    clrb   RS      ;set to control mode
         mov    w,#1    ;clear display
         lcall  loadlcd
         setb   RS      ;data mode
         mov    wcount,#0
:input   inc    wcount
         mov    w,wcount
         lcall  getdata
         call   loadlcd
         call   clik
         lset   :input
         cjb    wcount,#6,:input
         lcall  wait1
btrluk   clrb   RS      ;set to control mode
         mov    w,#1    ;clear display
         call   loadlcd
         setb   RS      ;data mode
:input   inc    wcount
         mov    w,wcount
         lcall  getdata
         call   loadlcd
         call   clik
         lset   :input
         cjb    wcount,#17,:input
         lcall  wait1
nxtime   clrb   RS      ;set to control mode
         mov    w,#1    ;clear display
         call   loadlcd
         setb   RS      ;data mode
:input   inc    wcount
         mov    w,wcount
```

```
        lcall   getdata
        call    loadlcd
        call    clik
        lset    :input
        cjb     wcount,#27,:input
        jmp     wate preamb  mov     !rb,#0
        mov     end_note,#6
        mov     index,#0
        jmp     music cngrts  clrb    RS      ;control mode
        mov     w,#1    ;clear display
        lcall   loadlcd
        setb    RS      ;data mode
        mov     wcount,#27
:input  inc     wcount
        mov     w,wcount
        lcall   getdata
        call    loadlcd
        call    clik
        lset    :input
        cjb     wcount,#43,:input
        lcall   wait1
uhvwon  clrb    RS
        mov     w,#1
        call    loadlcd
        setb    RS
:input  inc     wcount
        mov     w,wcount
        lcall   getdata
        call    loadlcd
        call    clik
        lset    :input
        cjb     wcount,#56,:input
        lcall   wait1
        lset    select select  cje     keyreg,#0,won
        cje     keyreg,#4,first
        cje     keyreg,#5,second
        cje     keyreg,#6,third won     jmp     wait first   clrb    RS
        mov     w,#1
        lcall   loadlcd
        setb    RS
        mov     wcount,#56
:input  inc     wcount
```

```
         mov    w,wcount
         lcall  getdata
         call   loadlcd
         call   clik
         lset   :input
         cjb    wcount,#69,:input
         jmp    wait second   clrb   RS
         mov    w,#1
         lcall  loadlcd
         setb   RS
         mov    wcount,#69
:input   inc    wcount
         mov    w,wcount
         lcall  getdata
         call   loadlcd
         call   clik
         lset   :input
         cjb    wcount,#83,:input
         jmp    wait third    clrb   RS
         mov    w,#1
         lcall  loadlcd
         setb   RS
         mov    wcount,#83
:input   inc    wcount
         mov    w,wcount
         lcall  getdata
         call   loadlcd
         call   clik
         lset   :input
         cjb    wcount,#96,:input
         jmp    wait wait     lcall  wait1
         call   wait1
         call   wait1
         call   wait1
         call   wait1
wate     lcall  wait1
         call   wait1
         call   wait1
         call   wait1
         call   wait1
         jmp    clr    ;the previous "LCALL" set the page bit to 0 music    nop

:loop    mov    w,index
         call   notes         ;Look up the frequency of next note.
         mov    freq, w       ;Put the frequency value into freq.
```

```
        mov    w,index
        call   lengths      ;Look up the length of the next note.

mov    duratn, w    ;Put the length value into duratn.

call   beep         ;Play the note.
        inc    index cjb    index,end_note,:loop  ;All notes done? If not, loop.
        clr    ra
        cje    end_note,#6,happy
        ljmp   sorry
happy   ljmp   cngrts
```

What is claimed is:

1. An interactive electronic prize verification and display apparatus for conducting a consumer promotion wherein an alphanumeric prize code sequence comprising a plurality of digits indicative of a prize is concealed on a consumer product comprising:

a keypad for receiving each of the plurality of digits of the alphanumeric prize code sequence from a consumer, said prize code sequence being concealed on said consumer product;

display means for displaying each digit of the alphanumeric prize code sequence as it is received from said consumer and for displaying a prize corresponding to the alphanumeric prize code sequence upon completion of entry thereof by the consumer; and control means operably connected with said keypad and said display means for receiving each digit of the alphanumeric prize code sequence from said keypad, for processing the alphanumeric prize code sequence to generate a prize signal corresponding to the alphanumeric prize code sequence and indicative of a prize to be awarded to the consumer, and for providing said prize signal to said display means to display an indication of said prize to be awarded to the consumer.

2. The interactive electronic prize verification and display apparatus of claim 1 wherein said prize code is concealed under a brim curl of a beverage cup.

3. The interactive electronic prize verification and display apparatus of claim 2 wherein said keypad includes keys representing the digits 0 through 9 and at least one key used to indicate completion of entry of the alphanumeric prize code sequence.

4. The interactive electronic prize verification and display apparatus of claim 3 wherein said processing of the alphanumeric prize code sequence by said control means is initiated by operation of said at least one key used to indicate completion of entry of the alphanumeric prize code sequence.

5. The interactive electronic prize verification and display apparatus of claim 2 wherein said alphanumeric prize code sequence is a pseudo-random sequence of the digits 0–9.

6. The interactive electronic prize verification and display apparatus of claim 2 wherein said control means includes a memory programmed with a series of winning alphanumeric prize code sequences and corresponding prizes and said control means operates to compare the alphanumeric prize code sequence received from said consumer with said series of winning alphanumeric prize code sequences.

7. The interactive electronic prize verification and display apparatus of claim 1 wherein said display means comprises a liquid crystal display.

8. The interactive electronic prize verification and display apparatus of claim 1 wherein said control means includes a central processing unit.

9. The interactive electronic prize verification and display apparatus of claim 8 wherein said central processing unit comprises a programmable integrated circuit.

10. A method of verifying a prize code provided on a consumer beverage cup and indicating a prize to be awarded to a consumer in a consumer promotion using an interactive electronic prize verification and display apparatus comprising the steps of:

unfurling a brim of a consumer beverage cup to reveal a concealed code sequence comprising a plurality of digits of a prize code;

receiving said plurality of digits of the prize code from the manual entry of the code by the consumer using an input device;

processing said prize code to generate a prize signal indicative of a prize corresponding to said prize code; and displaying an indication of said prize on a display.

11. The method of claim 10 wherein said processing step includes the step of comparing said prize code with a plurality of predetermined codes stored in a memory for determining whether said prize code entitles the consumer to a prize.

12. An interactive electronic prize verification and display apparatus for conducting a consumer promotion wherein an alphanumeric prize code sequence comprising a plurality of digits indicative of a prize is printed under a brim curl of a consumer beverage cup comprising:

a keypad for receiving a manual entry of each of the plurality of digits of the alphanumeric prize code sequence from the consumer;

a display panel displaying each digit of the alphanumeric prize code sequence as it is received from the consumer and displaying prize corresponding to the alphanumeric prize code sequence upon completion of entry thereof by the consumer; and processing circuitry connected with said keypad and said display panel, said processing circuitry operating to receive each digit of the alphanumeric prize code sequence from said keypad, to process the alphanumeric prize code sequence to generate a prize signal indicative of a prize corresponding to the alphanumeric prize code sequence, and to provide said prize signal to said display panel to display an indication of said prize to the consumer.

13. The interactive electronic prize verification and display apparatus of claim 12 wherein said keypad includes keys representing the digits 0 through 9 and at least one key used to indicate completion of entry of the alphanumeric prize code sequence.

14. The interactive electronic prize verification and display apparatus of claim 13 wherein said processing of the alphanumeric prize code sequence by said control means is initiated by operation of said at least one key used to indicate completion of entry of the alphanumeric prize code sequence.

15. The interactive electronic prize verification and display apparatus of claim 12 wherein said display panel comprises a liquid crystal display.

16. The interactive electronic prize verification and display apparatus of claim 12 wherein said processing circuitry comprises programmable integrated circuit.

17. The interactive electronic prize verification and display apparatus of claim 12 wherein said processing circuitry includes a memory programmed with a series of winning alphanumeric prize code sequences and corresponding prizes and said control means operates to compare the alphanumeric prize code sequence received from said consumer with said series of winning alphanumeric prize code sequences.

18. A method of conducting a consumer promotion comprising the steps of:

(a) imprinting each of a plurality of blanks used to form a plurality of consumer beverage cups with one of plurality of alphanumeric prize code sequences, a first portion of said alphanumeric prize code sequences indicative of a prize associated with each of said plurality of consumer beverage cups and a second portion of said alphanumeric prize code sequences different from said first portion;

(b) forming each of said blanks into one of said consumer beverage cups such that said alphanumeric prize code sequence is concealed under a brim curl of said consumer beverage cup and is not visible without deforming said consumer beverage cup;

(c) distributing said consumer beverage cups to at least one customer at a distribution location;

(d) providing at said distribution location an electronic prize verification system, said electronic prize verification system
receiving said alphanumeric prize code sequence from the manual entry of the code by said consumer, and indicating one of (1) a prize associated with said alphanumeric prize code sequence to be made to said customer and (2) that no prize will be awarded to said customer; and (e) when said electronic prize verification system indicates that a prize is to be awarded to said customer, receiving said consumer beverage cup from said customer, verifying said prize, and providing said prize to said customer.

19. The method of claim 18 wherein said step of indicating a prize associated with said alphanumeric prize code sequence includes the step of comparing said alphanumeric prize code sequence received from said customer with a predetermined plurality of winning alphanumeric prize code sequences and corresponding prizes stored within said electronic prize verification system.

20. The method of claim 18 wherein said indicating step includes the step of displaying a text message indicating to said at least one consumer that they are entitled to a prize.

21. The method of claim 18 wherein said indicating step includes the step of generating an audible tone indicating to said at least one consumer that they are entitled to a prize.

22. The method of claim 18 wherein said indicating step includes the step of displaying a text message indicating to said at least one consumer that they are not entitled to a prize.

23. The method of claim 18 wherein said indicating step includes the step of generating an audible tone indicating to said at least one consumer that they are not entitled to a prize.

24. An interactive electronic prize verification and display apparatus for conducting a consumer promotion wherein an alphanumeric prize code sequence comprising a plurality of digits indicative of a prize is concealed under a brim curl of a consumer beverage cup comprising:

a keypad for receiving each of the plurality of digits of the alphanumeric prize cod sequence from the consumer, said keypad including keys representing the digits 0 through 9 and at least one key used to indicate completion of entry of the alphanumeric prize code sequence;

a liquid crystal display panel displaying each digit of the alphanumeric prize code sequence as it is received from the consumer and, in response to a prize signal generated in response to actuation of said at least one key used to indicate completion of entry of the alphanumeric prize code sequence, displaying a prize corresponding to the alphanumeric prize code sequence;

a speaker generating an audible tone in response to said prize signal; and processing circuitry connected through an interface cable with said keypad and said liquid crystal display panel and operable connected with said speaker, said processing circuitry comprising a central processing portion and a memory portion, said memory portion containing a series of winning alphanumeric prize code sequences and corresponding prizes, and containing a computer program operating to (1) receive each digit of the alphanumeric prize code sequence by the manual entry of the code by the consumer using said keypad, (2) compare the alphanumeric prize code sequence received from said consumer with said series of winning alphanumeric prize code sequences contained with said memory to generate said prize signal indicative of a prize corresponding to the alphanumeric prize code sequence, (3) provide said prize signal to said liquid crystal display panel to display an indication of said prize to the consumer, and (4) provide said prize signal to said speaker to generate an audible indication of said prize to the consumer.

* * * * *